Nov. 11, 1947.  A. F. ALEXANDER  2,430,798
MOTOR TRANSMISSION
Filed Dec. 22, 1943

INVENTOR.
ARTHUR F. ALEXANDER
BY
Kwis Hudson Boughton & Williams
ATTORNEYS

Patented Nov. 11, 1947

2,430,798

UNITED STATES PATENT OFFICE 2,430,798

MOTOR TRANSMISSION

Arthur F. Alexander, Cleveland, Ohio

Application December 22, 1943, Serial No. 515,323

1 Claim. (Cl. 74—217)

This invention relates to improvements in motor transmissions, that is to say, change speed transmissions for electric motors.

One of the objects of the invention is the provision of mechanical means, assembled with the motor, to be sold and used as a part thereof for enabling the operator to take power from the power shaft, at any one of a plurality of different speeds.

Figure 1:
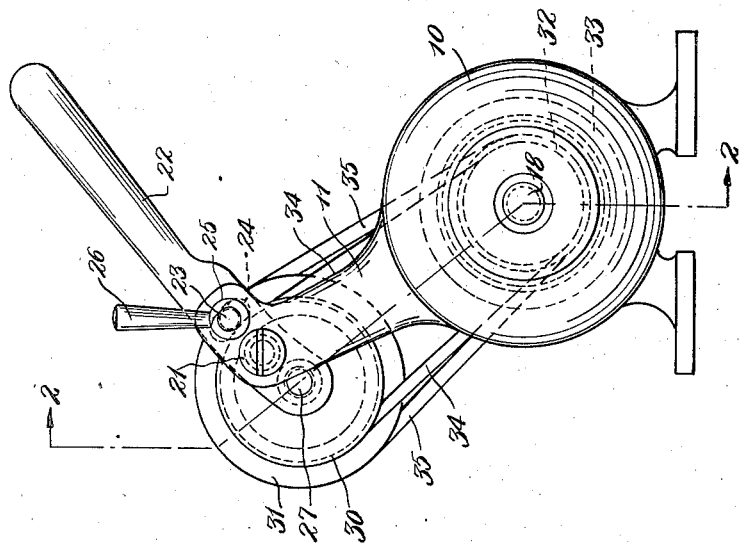
Figure 2:
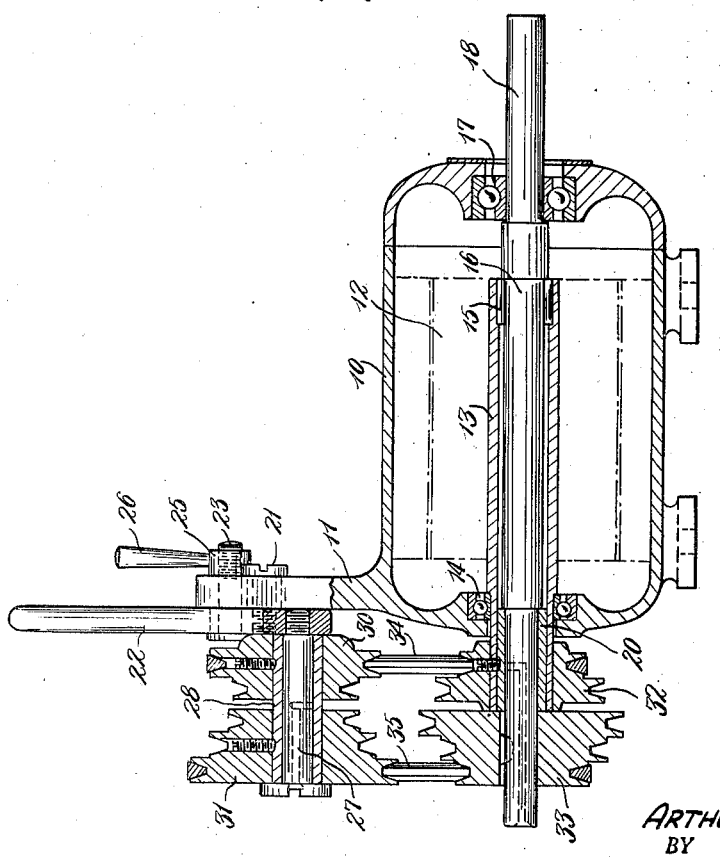

Other objects and features of novelty will appear as I proceed with the description of that embodiment of the invention which, for the purposes of the present application, I have illustrated in the accompanying drawing, in which:

Fig. 1 is an end view of an electric motor and transmission assembly embodying my invention, and Fig. 2 is a longitudinal sectional view taken substantially on the line 2—2 of Fig. 1.

In the drawing, 10 is a motor housing having an integral upwardly extending arm 11. The rotor 12 of the motor is carried upon a sleeve 13. At one end of the rotor this sleeve is mounted in a ball-bearing 14, while at the other end of the rotor the sleeve 13 is mounted upon a needle-bearing 15, supported by a power shaft 16. The latter shaft which corresponds in position to the conventional motor shaft, extends through a ball-bearing 17 in one end of the motor housing, and is provided with a projecting extremity 18 from which power may be taken. The other end of shaft 16 extends through a bronze bushing 20, which thus forms a bearing between the sleeve 13 and the shaft.

A screw 21 is threadably mounted in arm 11 and has a smooth end constituting a pivotal mounting for a lever 22 which may be held in various positions of adjustment by means of a clamping bolt 23 which extends through a hole in the lever and through an arcuate slot 24 in the arm 11. Clamping action may be exerted between the head of bolt 23, engaging lever 22, and a nut 25 which is threaded on the end of the bolt and caused to engage a surface of arm 11. For convenience in manipulation nut 25 is preferably provided with a handle 26.

Near its pivot pin 21 lever 22 carries a stub shaft 27 which has a constricted end threaded into the lever. A bushing 28, surrounding and rotatably mounted upon shaft 27, constitutes the countershaft of the transmission. A two step pulley 30 and a three step pulley 31 are secured to the countershaft 28 so as to rotate together. On a portion of the sleeve 13 projecting from the motor housing, I mount a two step pulley 32 identical with pulley 30 but turned end for end, while a pulley 33 identical with pulley 31 but turned end for end is keyed to the extremity of shaft 16 which projects beyond sleeve 13. The pulleys are preferably V pulleys, and a V belt 34 runs over pulleys 30 and 32 while another V belt 35 runs over pulleys 31 and 33.

It is not essential that pulleys 30 and 32 be two step pulleys, and if single step pulleys are employed in their stead the one on the sleeve 13 may be located within the motor housing, which of course would then be cut away to permit the belt 34 to pass. The pulley 30 on countershaft 28 corresponding with pulley 30 would of course be in the same vertical plane as the pulley within the housing and on the right hand side of the arm 11.

The operation of the invention will be readily understood. By the means disclosed the rotor 12 of the motor will turn pulley 32 which will function through belt 34 to turn pulley 30 and with it hollow crankshaft 28. Pulley 31, being fixed upon the countershaft, will turn, and through belt 35 will rotate pulley 33. The latter pulley, being keyed to shaft 16, will turn that shaft, and drive may be taken from the projecting end 18 thereof.

When it is desired to change the speed of the power shaft 16 the operator loosens clamping nut 25 and swings lever 22 counterclockwise as viewed in Fig. 1, thereby loosening the belts 34 and 35. One or both of the belts may then be shifted readily to obtain a selected new speed ratio, after which the lever 22 is swung clockwise to subject the belts to proper tension and the clamping nut 25 is screwed up to lock the countershaft in the operative position.

While in the drawing the plane through the two shafts 16 and 27 is shown inclined, it will be understood that it is quite within the purview of the invention to so dispose shaft 27 that this plane will be vertical. It will also be apparent that for more powerful motors it may be desirable to employ double or even triple belts with a consequent change in the pulley design.

Having thus described my invention, I claim:

In combination, an electric motor having a housing and a rotor, a hollow shaft for said rotor, a power shaft within said hollow shaft rotatable independently of the hollow shaft, a bracket on said housing, a lever pivoted on said bracket, a countershaft carried by said lever, a pair of identical reversed step pulleys mounted on said hollow shaft and countershaft, and a second pair of identical reversed step pulleys carried on said countershaft and said power shaft, and a belt connecting the pulleys of each pair, whereby movement of said lever in one direction will loosen said belts and permit them to be shifted, and means for securing said lever in different positions of adjustment.

ARTHUR F. ALEXANDER.

REFERENCES CITED

The following references are of record in the file of this patent:

UNITED STATES PATENTS

| Number | Name | Date |
| --- | --- | --- |
| 2,283,153 | Koch | May 12, 1942 |
| 2,235,441 | Nelson | Mar. 18, 1941 |
| 1,854,018 | Carlberg | Apr. 12, 1932 |
| 1,809,512 | Defrays | June 9, 1931 |
| 2,268,305 | Reinhard | Dec. 30, 1941 |
| 2,308,813 | Johnson | Jan. 19, 1943 |
| 1,442,217 | H'Doubler | Jan. 16, 1923 |

FOREIGN PATENTS

| Number | Country | Date |
| --- | --- | --- |
| 242,601 | Great Britain | Sept. 15, 1925 |